United States Patent Office 3,178,396
Patented Apr. 13, 1965

3,178,396
WATER-SOLUBLE VINYLBENZYL QUATERNARY
NITROGEN POLYMERS
William G. Lloyd, Bay City, Mich., assignor to The Dow
Chemical Company, Midland, Mich., a corporation of
Delaware
No Drawing. Filed Oct. 22, 1958, Ser. No. 768,836
7 Claims. (Cl. 260—80.5)

This invention concerns new water-soluble high molecular weight polymeric quaternary nitrogen halide resins by which term is included the polymeric quaternary ammonium halide resins and analogous polymeric quaternary nitrogen heterocyclic halides, e.g., the pyridinium halide, quinolinium halide, isoquinolinium halide and morpholinium halide types, halide being bromide or chloride, having a preponderance of combined vinylbenzyl ammonium salt units. It also concerns the preparation of such polymeric products by reacting a high molecular weight vinylbenzyl halide polymer, either linear or cross-linked having about 0.00 to 1 weight percent of a cross-linking agent, vinylbenzyl halide basis, with a tertiary amine having alkyl and/or hydroxyalkyl substituents, an alicyclic tertiary amine, or with an analogous nitrogen heterocyclic compound, e.g., a pyridine, quinoline, isoquinoline, or morpholine, e.g., pyridine, quinoline, isoquinoline, morpholine and their nuclearly alkylated homologs and analogs.

In U.S. patent application, Serial No. 766,711, filed October 13, 1958, now Patent No. 3,072,588, a method for making high molecular weight linear and lightly cross-linked vinylbenzyl chloride polymers is disclosed. The method concerns emulsion polymerizing an oil-in-water emulsion containing up to about 50 weight percent of vinylbenzyl chloride and from 0 to 1 weight percent divinylbenzene, vinylbenzyl chloride basis, in the presence of about 0.1 weight percent of a peroxy initiator, water basis, and up to about 10 weight percent of a water-in-oil emulsifying agent, water basis, advantageously at between 10° and 30° C. for about 2 to 60 hours. The polymeric products thereby obtained as a latex have a particle diameter ranging from about 200 A. to about 3000 A., and a molecular weight for the microgels of about 20 million to 10 billion, based on the mass of the latex particle, as calculated from the electron micrograph diameter, its density and the assumption (supported by viscosity behavior of dilute solutions) that there is only one molecule per latex particle in the presence of appreciable cross-linking agent and a specific viscosity for the linear polymers of about 1.3 to about 51.1, one percent solution basis. When recovered as a dry solid by spray drying in an inert atmosphere or by freeze coagulating, water washing, washing with methanol and drying at a low temperature up to about 50° C. in an inert atmosphere, the product is stable and dispersible in organic solvents. But when dried at an elevated temperature, or when exposed to an oxygen-containing gas, the product is less stable and gradually becomes non-dispersible in organic solvents.

It has now been discovered that a water-soluble high molecular weight quaternary ammonium halide or analogous polymeric quaternary nitrogen heterocyclic halide resin can be prepared by reacting the above-mentioned vinylbenzyl halide polymer, or its copolymer with not more than 30 weight percent of one or more monoalkenyl compounds of the alkyl and aryl series of the types including styrene and monoalkenyl monomers copolymerizable with styrene, such as alkylstyrenes acrylonitrile, acrylate and methacrylate esters, etc., preferably in aqueous latex form, with a substantially stoichiometric proportion of an alicyclic tertiary amine, a tertiary amine having alkyl and/or hydroxy alkyl substituents containing from 1 to 4 carbon atoms, e.g., trimethyl, triethyl, tripropyl, tributyl, dimethyl hydroxyethyl, methyl bis (hydroxypropyl), etc. or with a morpholine, pyridine, quinoline, isoquinoline or their monoalkylated or poly-alkylated derivatives having 1 to 4 carbon atom alkyl group substituents at a temperature between about —15° and 100° C. The products are water soluble high molecular weight vinylbenzyl quaternary ammonium halide polymers or analogous polymeric quaternary nitrogen heterocyclic halides. By the term "water-soluble" is meant a time-stable, visually homogeneous solution in water. While reaction involves substantially stoichiometric proportions (from 0.9 to 1.1 moles of tertiary amine or nitrogen heterocyclic compound per side chain halide), it is preferred to use an excess of nitrogen compound, advantageously up to about twice that of theory. Since the tertiary amine, morpholine, pyridine, quinoline and isoquinoline reactants can be recovered, the amount of their excess is immaterial. Water, solvents such as lower monohydric alcohols, polyhydric alcohols, ketones, and ethers, usually all having up to 4 carbon atoms, and aqueous solutions of such water-miscible solvents, dissolve the product resin and are useful reaction media. A reaction temperature of about —15° to about 100° C. is used, depending somewhat upon volatility of the tertiary amine or equivalent nitrogen compound.

The following equation is typical of the reaction involved:

$$(-CH_2-\overset{|}{C}H\text{-arylene-}CH_2Cl)_n + n(CH_3)_3N =$$

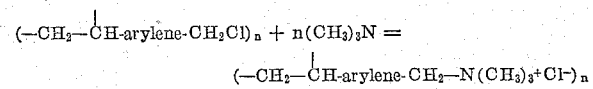

The method of this invention thus applies a chemical reaction not previously used with a microgel or high molecular weight linear polymer. Styrene-type microgels have never before been rendered water-soluble by a chemical modification of this type.

The products of this invention, consisting of linear and microgel polymers ranging in molecular weight from about 20 million to about 10 billion for the microgels and having specific viscosities between about 1.3 and 51.1 for the linear polymers, are useful as aqueous gelation agents at a concentration as low as 0.1 percent. They have a uniformity superior to that of starch derivatives. The products of this invention are also unusually effective flocculants.

The following examples show ways in which the invention has been practiced.

EXAMPLE 1

A series of polymeric high molecular weight vinylbenzyl chloride latexes was prepared having the following amounts of divinylbenzene, hereinafter referred to as DVB, incorporated as a crosslinking agent: 0.00 percent, 0.02 percent, 0.04 percent, 0.06 percent, 0.08 percent, 0.20 percent, 0.40 percent, 0.60 percent and 0.80 percent. In each case, 100 ml. of the wet latex containing 0.184 g.-equiv. of benzyl chloride groups, was diluted with 591 ml. deionized water and treated with 51.7 ml. of 25 percent trimethylamine in water (0.2023 mole, 110 percent of theory), the mixture was shaken and allowed to stand at room temperature. Within two hours the milky opaque latexes were converted to transparent or substantially transparent solutions, varying in consistency from gels (at 0.00–0.08 percent DVB) to viscous fluids (0.20–0.80 percent DVB). These solutions diluted smoothly in water to yield time-stable solutions (i.e., visually continuous) of polymeric (trimethyl(ar-vinylbenzyl) ammonium chloride).

EXAMPLE 2

Fifty ml. of wet polymeric vinylbenzyl chloride microgel latex containing 26.6 percent polymer solids (the latexes hereinafter referred to all contain 0.05 percent divinylbenzene unless otherwise noted), was treated with 25.5 ml. of 25 percent trimethylamine in water (110 percent of theory), the mixture was shaken vigorously and allowed to stand at room temperature. In less than half an hour, the mixture was transformed into a clear, firm, glassy gel containing 25.4 percent poly (trimethyl (ar-vinylbenzyl) ammonium chloride) microgel. This gel was dispersible in water by vigorous and protracted shaking. Its aqueous solutions were time-stable.

EXAMPLE 3

Twenty-five g. of the same latex as in Example 2 was treated at room temperature with 56.9 g. deionized water and 11.15 ml. of 25 percent trimethylamine solution (100 percent of theory), to give a clear, firm gel containing 10.0 percent poly (trimethyl(ar-vinylbenzyl) ammonium chloride) microgel (hereafter abbreviated as TMBA microgel). This also was diluted upon protracted shaking in water, to yield time-stable solutions.

EXAMPLE 4

Twenty-five g. of the same latex as in Example 2 was treated at room temperature with 33.85 g. water, 23.05 g. isopropanol and 11.15 g. of 25 percent trimethylamine solution. This mixture was transformed within an hour at room temperature to a clear, smooth, pourable, viscous liquid, very easily dilutable with water to give time-stable, dilute solutions. The product solution contained 10.0 percent TMBA microgel and 25 percent isopropanol. By this same technique, i.e., by using approximately 25 percent isopropanol in the solvent reaction medium, 15–20 percent polymer solutions were obtained. The presence of an appreciable amount, up to about 30 weight percent, of a water-miscible solvent such as a lower monohydric or polyhydric alcohol, ketone or ether, makes possible the preparation of relatively concentrated resin solutions which are readily pourable and smoothly dilutable with water.

EXAMPLE 5

To 2 g. of dry polymeric vinylbenzyl chloride, prepared from the latex of Example 2, was added 50 ml. water and 1 ml. of a 20 percent solution of Triton X–100 (a dodecylphenol-ethylene oxide reaction product, added as a wetting agent), and 6.7 ml. of 25 percent trimethylamine (200 percent of theory) at room temperature. On standing overnight in a shaker at room temperature, the mixture was transformed into a clear, highly viscous liquid, dilutable with water.

EXAMPLE 6

To 5 g. wet polymeric vinylbenzyl chloride microgel latex were added 36.25 g. water and 2.05 g. of redistilled triethylamine (200 percent of theory), and the mixture was allowed to stand for four days at room temperature, by which time it was transformed to a transparent chartreuse-tinted poly(triethyl(ar-vinylbenzyl) ammonium chloride) microgel, smoothly dilutable in water.

EXAMPLE 7

To 5 g. wet polymeric vinylbenzyl chloride microgel latex were added 38.95 g. water and 2.90 g. of tri-n-propylamine (200 percent of theory), and the mixture was allowed to stand at room temperature. After two months, the mixture, initially water-thin, was transformed to a white, creamy, viscous material, smoothly dilutable with water. This product, poly(tri-n-propyl(ar-vinylbenzyl) ammonium chloride) microgel, formed time-stable water dispersions.

EXAMPLE 8

To 10 g. polymeric vinylbenzyl chloride microgel latex (28.9 percent polymer solids) was added 80.0 g. ethylene glycol and 10 g. N,N-dimethylaminoethanol, and the mixture was shaken and allowed to stand. After three days at room temperature, the mixture was transformed to a clear, transparent, viscous, water-dilutable solution of poly(dimethyl(2-hydroxyethyl)(ar-vinylbenzyl) ammonium chloride) microgel.

EXAMPLE 9

To 20 g. of a stock solution of 10 weight percent polymeric vinylbenzyl chloride microgel latex in aqueous 65 percent diethylene glycol was added 4.0 g. of N-methyliminobis(ethanol) and 16.0 g. of diethylene glycol, and the mixture was placed in a waterbath at 80° C. In 85 minutes, it was transformed into a viscous translucent gel and in 130 minutes into a very viscous nearly-transparent gel, unchanged by further heating. This gave a water-dilutable product, poly(methyl-di-(2-hydroxyethyl)(ar-vinylbenzyl) ammonium chloride) microgel.

EXAMPLE 10

To a mixture of 25 ml. of polymeric vinylbenzyl chloride microgel latex (16 percent polymer solids, 0.025 percent divinylbenzene) and 25 ml. ethylene glycol, immersed in a steam bath at 100° C., was added a mixture of 25 ml. of 25 percent trimethylamine and 25 ml. ethylene glycol. The resultant mixture was capped and maintained at 100° C. Within less than five minutes, the mixture was converted to a clear, pale yellow, pourable TMBA microgel solution. After 18.5 hours' continual heating at 100° C., the sample was cooled and found to dilute smoothly and rapidly with water, indicating no significant degradation.

EXAMPLE 11

Identical amounts of the reagents described in Example 10 were mixed together at room temperature (32° C.) and allowed to stand. The mixture was still opaque after five minutes, but transparent and substantially reacted by ten minutes.

EXAMPLE 12

Identical amounts of the reagents described in Example 10 were separately precooled in ice, then mixed and allowed to stand in a 0° C. ice bath. The mixture was still opaque after 75 minutes, but was transformed to a clear, transparent, viscous gel by 185 minutes.

EXAMPLE 13

Identical amounts of the reagents described in Example 10 were separately precooled in ice-ammonium chloride, then mixed and allowed to stand at −15° C. The mixture was still opaque at 186 minutes, but on standing overnight (1100 minutes) at −15° C. was transformed to a clear, transparent, viscous gel, readily dilutable with water.

EXAMPLE 14

To 196.8 g. of polymeric vinylbenzyl chloride microgel latex (15.5 percent polymer solids, 0.05 percent DVB, 0.005 percent dodecyl mercaptan), wherein the latex particles had an average diameter of 390 Angstrom units, as determined by electron micrograph measurement, was added 74.4 g. water, 104.8 g. isopropanol and 48.2 g. 25 percent trimethylamine, and the mixture was shaken and let stand at room temperature. Within one hour, the mixture was transformed to a clear, smooth, highly viscous liquid, readily dilutable with water.

EXAMPLE 15

To 100 g. of polymeric vinylbenzyl chloride microgel latex (15.5 percent polymer solids, 0.05 percent DVB, 0.005 percent dodecyl mercaptan), wherein the latex particles had an average diameter of 1994 Angstrom units, as determined by electron micrograph measurement, was added 194.1 g. water, 106 g. isopropanol and 24 g. 25 percent trimethylamine, and the mixture was shaken and allowed to stand at room temperature. Within an hour, the mixture had become quite viscous, and within 24 hours the mixture had become transformed to a nearly transparent, viscous solution, readily dilutable with water.

EXAMPLE 16

The following series of microgen latexes were prepared, in which vinylbenzyl chloride was one component in a microgel copolymer, and treated at room temperature with trimethylamine. In each case, 100 g. of wet latex containing 26.6 percent polymer solids was treated with 950 ml. of water and 110 percent of the theoretical amount of 25 percent trimethylamine. In each case 0.05 percent divinylbenzene was present.

Where vinylbenzyl chloride was present to the extent of 70 weight percent or more, the products were smooth viscous solutions; where vinylbenzyl chloride was present to the extent of 85 percent or more, the products were substantially transparent viscous solutions. In all cases the product mixtures were smoothly dilutable with water and not subject to coagulation by addition of aqueous mineral acid or base. However, with less than 70 weight percent vinylbenzyl chloride, milky, low viscosity products were obtained.

Reactant latex composition, proportions by weight:
  Vinylbenzyl chloride 75 percent+styrene 25 percent
  Vinylbenzyl chloride 50 percent+styrene 50 percent
  Vinylbenzyl chloride 90 percent+acrylonitrile 10 percent
  Vinylbenzyl chloride 75 percent+acrylonitrile 25 percent
  Vinylbenzyl chloride 50 percent+acrylonitrile 50 percent
  Vinylbenzyl chloride 85 percent, acrylonitrile 5 percent+methyl acrylate 10 percent
  Vinylbenzyl chloride 70 percent, acrylonitrile 5 percent+methyl acrylate 25 percent
  Vinylbenzyl chloride 45 percent, acrylonitrile 5 percent+methyl acrylate 50 percent
  Vinylbenzyl chloride 20 percent, acrylonitrile 5 percent+methyl acrylate 75 percent

EXAMPLE 17

To 2 g. of dry polymeric vinylbenzyl chloride microgel was added 50 ml. water, 1 ml. of 20 percent Triton X-100, and 2.1 ml. (200 percent of theory) of redistilled pyridine at room temperature. The mixture was shaken overnight, then allowed to stand an additional 24 hours at room temperature, whereupon it yielded a clear, homogeneous, water-dilutable solution of poly(ar-vinylbenzyl) pyridinium chloride) microgel. This solution was stable indefinitely (over ten months) at room temperature storage conditions, but, unlike TMBA microgel solutions, is degraded at room temperature by aqueous alkali.

EXAMPLE 18

To 15 g. of wet polymeric vinylbenzyl chloride microgel latex (26.6 percent polymer solids) was added 82.7 g. water and 2.3 g. (110 percent of theory) of pyridine. The mixture was shaken and allowed to stand three days (over the weekend), whereupon a clear, colorless, smooth, soft gel of poly-(1(ar-vinylbenzyl)pyridinium chloride) solution was obtained. This was readily dilutable in water to give stable solutions.

Other monoalkyl and polyalkyl substituted pyridines, except those substituted both in the 2 and 6 position, having alkyl groups containing between 1 and 4 carbon atoms are substituted for the pyridine in Examples 17 and 18 with advantageous results. Polyalkylated pyridines substituted both in the 2- and 6-positions behave like sterically hindered compounds whose reaction rates are impractical.

EXAMPLE 19

Solutions of 1.00 percent poly(trimethyl(ar-vinylbenzyl) ammonium chloride) polymer (TMBA polymer) were prepared in water containing 2.50 percent isopropyl alcohol, and the viscosities determined at 30° C. The results for polymers of varying physical composition are shown in Table I, using as solvent 97.5 weight percent water and 2.5 percent isopropanol. The viscosities are given in centistokes.

Table I.—Summary of viscosity data

| Percent DVB | Percent DDM | Viscosity of 1.0% solution, cks. | Physical structure |
| --- | --- | --- | --- |
| 0.00 | 0.000 | 51.1 | Linear |
| 0.00 | 0.50 | 2.4 | Linear |
| 0.05 | 0.50 | 2.5 | Linear |
| 0.15 | 0.50 | 5.5 | Linear |
| 0.50 | 0.50 | 8.9 | Linear |
| 0.05 | 0.000 | 27.4 | Microgel |
| 0.15 | 0.000 | 11.9 | Microgel |
| 0.05 | 0.005 | 41.0 | Microgel |
| 0.15 | 0.050 | 34.4 | Microgel |

EXAMPLE 20

Illustrative raw viscosity data for a typical microgel (no DDM) and a typical linear structure (no DVB) are given in the following table.

Table II.—Raw viscosity data

| Concentration, wgt. percent | Specific viscosity for 0.15% DVB (no DDM) | Specific viscosity for 0.50% DDM (no DVB) |
| --- | --- | --- |
| 1.00 | [1] 0.130 | 1.30 |
| 0.67 | [1] 0.103 | 1.05 |
| 0.50 | [1] 0.0677 | 0.89 |
| 0.33 | [1] 0.0452 | 0.679 |
| 0.25 | [1] 0.320 | 0.581 |
| 0.167 | [1] 0.0201 | 0.458 |
| 0.125 | [1] 0.0175 | 0.427 |

[1] Polymer concentrations are one-tenth of the indicated concentration.

EXAMPLE 21

A sample of TMBA polymer made from 600 Angstrom polyvinylbenzyl chloride latex containing 0.50 percent DDM and no DVB, having a 1.0 percent solution specific viscosity of 2.4 and an intrinsic viscosity of 14 was diluted to 0.050 percent concentration in water. This solution of linear TMBA polymer was then checked for flocculation activity, using an aqueous 1.0 percent suspension of Peabody coal fines as the test suspension. The results are shown in the following table.

Table III.—*Flocculant activity of TMBA linear polymer with Peabody coal fines*

| Time in seconds | Volume of coal fines suspension in 100 ml. sample | |
|---|---|---|
| | Control, no additive | With 3 drops 0.015% TMBA polymer |
| 100 | ca. 99 | 13.2 |
| 200 | 99 | 10.3 |
| 300 | 99 | 9.1 |
| 500 | 99 | 8.0 |
| 2,000 | 95 | Not determined |

Comparable flocculant activity is observed with microgel TMBA polymers as well as with the analogous pyridinium, quinolinium and isoquinolinium polymers disclosed herein.

EXAMPLE 22

A series of water-soluble microgel polymers, prepared from approximately 600 Angstrom poly(ar-vinylbenzyl chloride) latex containing 0.050 percent divinylbenzene and 0.005 percent dodecyl mercaptan, was prepared by the following recipe. To 30 ml. water and 20 ml. isopropyl alcohol was added in series 10 ml. of each of the following nucleophiles and 20 ml. of wet polyvinylbenzyl chloride latex (27.0 percent polymer solids), and the reaction mixture was placed upon a shaker kept at room temperature for 60 hours. By this time, all of the polymers had formed clear, water-soluble gels.

| Nucleophile | Polymer |
|---|---|
| 2-picoline | Poly(1-(ar-vinylbenzyl)-2-picolinium chloride). |
| 3-picoline | Poly(1-(ar-vinylbenzyl)-3-picolinium chloride). |
| 4-picoline | Poly(1-(ar-vinylbenzyl)-4-picolinium chloride). |
| 2,4-lutidine | Poly(1-(ar-vinylbenzyl)-2,4-lutidinium chloride). |
| 4-(ω-hydroxy-propyl)pyridine | Poly(1-(ar-vinylbenzyl)-4-(w-hydroxypropyl)-pyridinium chloride). |
| quinoline | Poly(1-(ar-vinylbenzyl)quinolinium chloride). |
| isoquinoline | Poly(2-(ar-vinylbenzyl)isoquinolinium chloride). |

EXAMPLE 23

To 10 ml. of 4-methylmorpholine in a solution of 30 ml. water and 20 ml. isopropanol was added 20 ml. of wet polyvinylbenzyl chloride latex (27.0 percent polymer solids, 0.05 percent divinylbenzene, 0.005 percent dodecyl mercaptan, particle size about 600 angstroms), and the mixture was placed on a shaker at room temperature over the weekend (63 hours), whereupon a homogeneous, clear, pale tan solution of poly(4-methyl-4-(ar-vinylbenzyl)morpholinium chloride) microgel was obtained. The clear viscous solution, containing 10.2 g./100 ml. of polymer, was readily and smoothly dilutable with water.

What is claimed is:

1. A water-soluble high molecular weight polymeric product of the group consisting of linear and crosslinked polymers having in combined form 0.00 to 1 weight percent of a crosslinking agent and at least about 70 weight percent of monovinylaryl monomer units having on their aryl nuclei a —$CH_2P_yCl$ substituent wherein $P_y$ is a 1-pyridinium group, the balance of the polymer being a combined monoalkenyl comonomer of the group consisting of styrene and monoalkenyl monomers copolymerizable with styrene, the molecular weight of said crosslinked products having a calculated value of between about 20 million and about 10 billion based on volume and density measurements, and the specific viscosities of the linear products varying between about 1.3 and about 51.1 for one percent concentrations in a mixture of 97.5 weight percent water and 2.5 percent isopropanol.

2. A water-soluble high molecular weight polymeric product of the group consisting of linear and crosslinked polymers having in combined form 0.00 to 1 weight percent of a crosslinking agent and at least about 70 weight percent of monovinylaryl monomer units having on their aryl nuclei a —$CH_2PicCl$ substituent wherein Pic is a 2-picolinium group, the balance of the polymer being a combined monoalkenyl comonomer of the group consisting of styrene and monoalkenyl monomers copolymerizable with styrene, the molecular weight of said crosslinked products having a calculated value of between about 20 million and about 10 billion based on volume and density measurements, and the specific viscosities of the linear products varying between about 1.3 and about 51.1 for one percent concentrations in a mixture of 97.5 weight percent water and 2.5 percent isopropanol.

3. A water-soluble high molecular weight polymeric product of the group consisting of linear and crosslinked polymers having in combined form 0.00 to 1 weight percent of a crosslinking agent and at least about 70 weight percent of monovinylaryl monomer units having on their aryl nuclei a —$CH_2P_yCl$ substituent wherein $P_y$ is a 3-picolinium group, the balance of the polymer being a combined monoalkenyl comonomer of the group consisting of styrene and monoalkenyl monomers copolymerizable with styrene, the molecular weight of said crosslinked products having a calculated value of between about 20 million and about 10 billion based on volume and density measurements, and the specific viscosities of the linear products varying between about 1.3 and about 51.1 for one percent concentrations in a mixture of 97.5 weight percent water and 2.5 percent isopropanol.

4. A water-soluble high molecular weight polymeric product of the group consisting of linear and crosslinked polymers having in combined form 0.00 to 1 weight percent of a crosslinking agent and at least about 70 weight percent of monovinylaryl monomer units having on their aryl nuclei a —$CH_2P_yCl$ substituent wherein $P_y$ is a 4-picolinium group, the balance of the polymer being a combined monoalkenyl comonomer of the group consisting of styrene and monoalkenyl monomers copolymerizable with styrene, the molecular weight of said crosslinked products having a calculated value of between about 20 million and about 10 billion based on volume and density measurements, and the specific viscosities of the linear products varying between about 1.3 and about 51.1 for one percent concentrations in a mixture of 97.5 weight percent water and 2.5 percent isopropanol.

5. A water-soluble high molecular weight polymeric product of the group consisting of linear and crosslinked polymers having in combined form 0.00 to 1 weight percent of a crosslinking agent and at least about 70 weight percent of monovinylaryl monomer units having on their aryl nuclei a —$CH_2P_yCl$ substituent wherein Py is a 2,4 lutidinium group, the balance of the polymer being a combined monoalkenyl comonomer of the group consisting of styrene and monoalkenyl monomers copolymerizable with styrene, the molecular weight of said crosslinked products having a calculated value of between about 20 million and about 10 billion based on volume and density measurements, and the specific viscosities of the linear products varying between about 1.3 and about 51.1 for one percent concentrations in a mixture of 97.5 weight percent water and 2.5 percent isopropanol.

6. A water-soluble high molecular weight polymeric product of the group consisting of linear and crosslinked polymers having in combined form 0.00 to 1 weight percent of a crosslinking agent and at least about 70 weight percent of monovinylaryl monomer units having on their aryl nuclei a —$CH_2P_yCl$ substituent wherein $P_y$ is a 4-(ω-hydroxypropyl)pyridinium group, the balance of the polymer being a combined monoalkenyl comonomer of the group consisting of styrene and monoalkenyl monomers copolymerizable with styrene, the molecular weight of said crosslinked products having a calculated value of between about 20 million and about 10 billion based on volume and density measurements, and the specific viscosities of the linear products varying between about 1.3 and about 51.1 for one percent concentrations in a mixture of 97.5 weight percent water and 2.5 percent isopropanol.

7. A water-soluble high molecular weight polymeric product of the group consisting of linear and crosslinked polymers having in combined form 0.00 to 1 weight percent of a crosslinking agent and at least about 70 weight percent of monovinylaryl monomer units having on their aryl nuclei a —$CH_2MCl$ substituent wherein M is a 4-morpholinium group, the balance of the polymer being a combined monoalkenyl comonomer of the group consisting of styrene and monoalkenyl monomers copolymerizable with styrene, the molecular weight of said crosslinked products having a calculated value of between about 20 million and about 10 billion based on volume and density measurements, and the specific viscosities of the linear products varying between about 1.3 and about 51.1 for one percent concentrations in a mixture of 97.5 weight percent water and 2.5 percent isopropanol.

References Cited by the Examiner

UNITED STATES PATENTS

| | | | |
|---|---|---|---|
| 2,694,702 | 11/54 | Jones | 260—2.1 |
| 2,780,604 | 2/57 | Clarke et al. | 260—2.1 |
| 2,884,057 | 4/59 | Wilson et al. | 260—89.7 |
| 2,992,544 | 7/61 | McMaster | 260—87.5 |

JOSEPH L. SCHOFER, *Primary Examiner.*

H. N. BURSTEIN, MILTON STERMAN, P. E. MANGAN, M. LIEBMAN, J. R. LIBERMAN, WILLIAM H. SHORT, *Examiners.*